United States Patent [19]

Takeuchi et al.

[11] Patent Number: 4,807,034

[45] Date of Patent: Feb. 21, 1989

[54] NOISE REDUCTION CIRCUIT FOR VIDEO SIGNAL HAVING FIELD MEMORY

[75] Inventors: Motohiko Takeuchi, Yokohama; Masaaki Kisou, Ichikawa, both of Japan

[73] Assignee: Kabushiki Kaisha Toshiba, Kawasaki, Japan

[21] Appl. No.: 163,605

[22] Filed: Mar. 3, 1988

[30] Foreign Application Priority Data

Mar. 12, 1987 [JP] Japan .................................. 62-55350

[51] Int. Cl.⁴ .......................... H04N 5/21; H04N 7/18
[52] U.S. Cl. ..................................... 358/167; 358/105; 358/36; 358/340
[58] Field of Search ................. 358/105, 166, 167, 36, 358/340, 336

[56] References Cited

U.S. PATENT DOCUMENTS

| | | | |
|---|---|---|---|
| 4,090,221 | 5/1978 | Connor | 358/167 |
| 4,246,610 | 1/1981 | Takahaski | 358/167 |
| 4,291,333 | 9/1981 | Warnock et al. | 358/36 |
| 4,365,490 | 1/1983 | Rieclerer | 358/167 |
| 4,539,594 | 9/1985 | Illetschko | 358/167 |
| 4,581,642 | 4/1986 | Poetsch et al. | 358/167 |
| 4,661,849 | 4/1987 | Hinman | 358/105 |

FOREIGN PATENT DOCUMENTS 3510213A 10/1985 Fed. Rep. of Germany .
3743602A 10/1988 Fed. Rep. of Germany .

*Primary Examiner*—James J. Groody
*Assistant Examiner*—John K. Peng
*Attorney, Agent, or Firm*—Cushman, Darby & Cushman

[57] ABSTRACT

A noise reduction circuit allows a field memory to store 1-field data of a video signal through a subtracting circuit. The video signal is supplied from a VTR through an A/D converter. The noise reduction circuit causes a subtracting circuit to subtract a delayed video signal, which is supplied from the field memory with a 1-field time delay, from the video signal and allows the resultant signal to be output as a field difference signal. A noise component included in the video signal is extracted by a noise extracting circuit in accordance with the field difference signal, and is output to the subtracting circuit. In a comparing circuit, the noise component is compared with a predetermined reference value so as to determine whether the video signal represents a motion or motionless picture. In accordance with this determination result, memory control circuit controls whether to write the video signal supplied from the subtracting circuit in the field memory. In addition, a video signal from which the noise component is removed is supplied from the subtracting circuit and monitored on a CRT display through a D/A converter or the like.

13 Claims, 2 Drawing Sheets

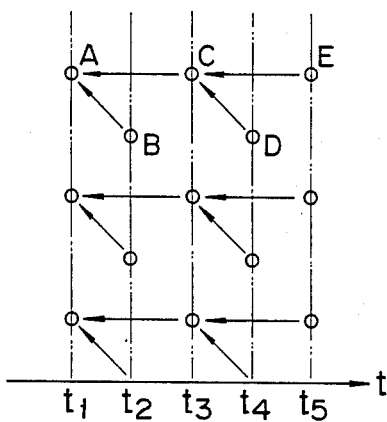
F I G. 3A
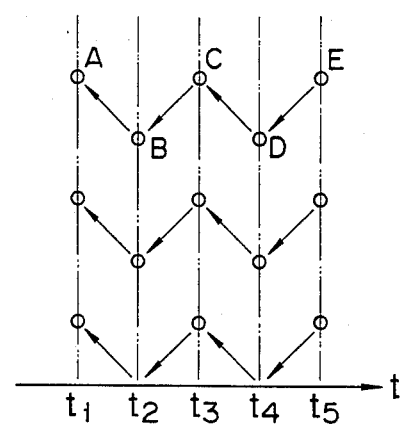
F I G. 3B
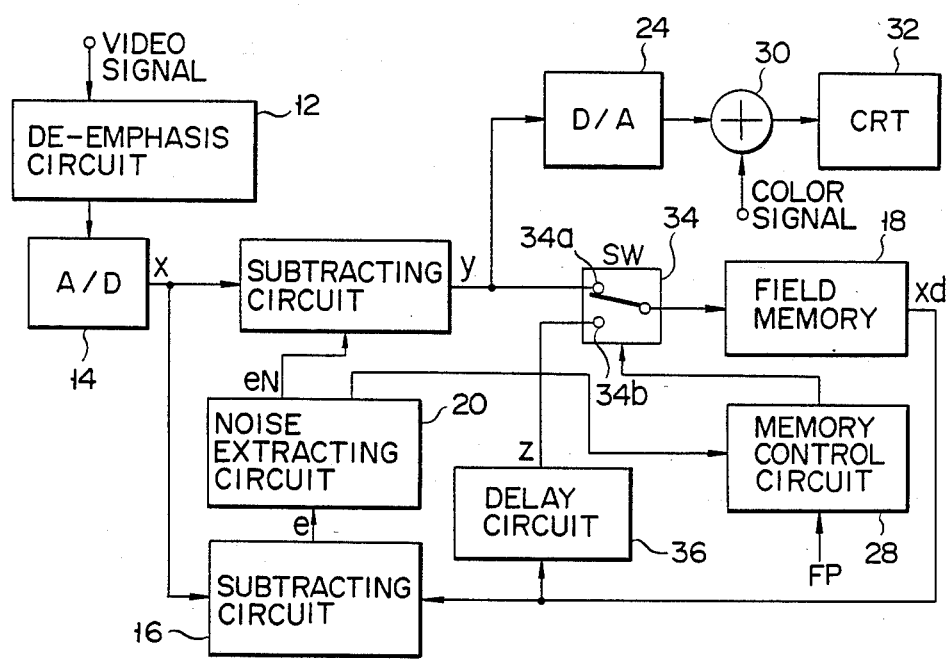
F I G. 4

NOISE REDUCTION CIRCUIT FOR VIDEO SIGNAL HAVING FIELD MEMORY

BACKGROUND OF THE INVENTION

1. Field of the Invention.

This invention relates generally to a noise reduction circuit and, more particularly, to the noise reduction circuit for a video signal having a field memory.

2. Description of the related art.

In conventional magnetic recording/reproducing apparatus for recording and reproducing video signals, noise reduction circuits are used to decrease noise components included in the video signals. These noise reduction circuits are categorized into two types, i.e., one using the frame correlation and the other using the field correlation.

For example, a noise circuit using the frame correlation compares a pixel in the current frame with the identical pixel of the immediately preceding frame in a direction of the same time base. When the difference in level between the pixels upon comparison is relatively large, a corresponding picture is considered a motion picture. As a result, a video signal of the pixel in current frame is directly output. In this case, the motion picture corresponds to a video signal changing between the frames.

On the contrary, when the difference in level between the pixels is relatively small, a corresponding picture is considered a motionless picture (corresponds to a video signal which does not change between the frames). The difference is basically considered a noise component. This noise component is subtracted from the video signal of the current pixel, and the resultant signal is output, thereby reducing noise in the video signal.

Similar to the above circuit using the frame correlation, a noise reduction circuit using the field correlation compares a pixel in the current frame with the identical pixel of the immediately preceding field in a direction of the same time basis. In response to the difference upon comparison, the circuit directly outputs the video signal of the current pixel, or outputs a video signal obtained by subtracting a noise component corresponding to the difference from the video signal of the current pixel.

The noise reduction circuit using the field correlation can reduce the capacity of a field memory to ½ that of the type using the frame correlation. In addition, an after-image caused when the motion of a picture is rapidly changed can be reduced compared with the type using the frame correlation.

However, in the type using the field correlation, since the video signal is scanned by the interlace scanning method, although the pixel positions between fields coincide with each other in the horizontal direction, those in the vertical direction are shifted from each other by ½h (h=scanning line interval). For this reason, the vertical resolution is degraded.

SUMMARY OF THE INVENTION

Accordingly, it is an object of the present invention to provide a noise reduction circuit for a video signal having a field memory, which can prevent the occurrence of an after-image due to changes in image, and the degradation of the vertical resolution.

According to the present invention, there is provided a noise reduction circuit for a video signal having a field memory, the circuit comprises an A/D converter for converting an input video signal into a digital signal, first subtracting circuit means for reducing a noise component included in the input video signal of the digital signal from the A/D converter by subtracting a noise component signal corresponding to the noise component from the digital signal, field memory means for storing at least 1-field data of an output from the first subtracting circuit means and allowing the stored data to be read out with a predetermined delay time, second subtracting circuit means for subtracting the data read out from the field memory means from the digital signal supplied from the A/D converter and outputting a subtraction result as a field difference signal, noise extracting circuit means for selecting the noise component signal corresponding to the noise component in accordance with the field difference signal from the second subtracting circuit means and outputting the selected noise component signal to the first subtracting circuit means, comparing circuit means for comparing the field difference signal from the second subtracting circuit means with a predetermined reference value, detecting the input video signal as a signal representing a motion picture when the field difference signal is larger than the reference value, and outputting a detection signal corresponding to the motion picture, and detecting the input video signal as a signal representing a motionless picture when the field difference signal is smaller than the reference value, and outputting a detection signal corresponding to the motionless picture, memory control circuit means for controlling whether to write a video signal supplied from the first subtracting circuit means to the field memory means in accordance with the detection signal output from the comparing circuit means, and a D/A converter for converting the digital signal from which the noise component is removed by the first subtracting circuit means into an analog signal and outputting a resultant signal.

According to another aspect of the invention, there is provided a noise reduction circuit for a video signal having a field memory, the circuit comprises an A/D converter for converting an input video signal into a digital signal, first subtracting circuit means for reducing a noise component included in the input video signal of the digital signal from the A/D converter by subtracting a noise component signal corresponding to the noise component from the digital signal, field memory means for storing at least 1-field data of an output from the first subtracting circuit means and allowing the stored data to be read out with a predetermined delay time, second subtracting circuit means for subtracting the data read out from the field memory means from the digital signal supplied from the A/D converter and outputting a subtraction result as a field difference signal, noise extracting circuit means for selecting the noise component signal corresponding to the noise component in accordance with the field difference signal from the second subtracting circuit means and outputting the selected noise component signal to the first subtracting circuit means, delay circuit means for delaying the data read out from the field memory means for a predetermined period of time and outputting the data, switching means, inserted between the first subtracting circuit means and the field memory means, for respectively supplying the video signal output from the first subtracting circuit means and a delayed video signal output from the delay circuit means to first and second terminals, and outputting either the video signal or the delayed video signal to the field memory means by switching and selecting the first or second terminal, memory control circuit means for determining whether the input signal is regarded as a signal representing a motion or motionless picture in accordance with the field difference signal output from the noise extracting circuit means and switching the outputs supplied to the switching means by switching the terminals thereof, thereby controlling whether to write the video signal input to the field memory means, and a D/A converter for converting the digital signal from which the noise component is removed by the first subtracting circuit means into an analog signal and outputting a resultant signal.

BRIEF DESCRIPTION OF THE DRAWINGS

The manner in which the foregoing and other objects of this invention are accomplished will be apparent from the accompanying specification and claims considered together with the drawings, wherein:

FIGS. 3A and 3B are schematic views for explaining an operation of the embodiment wherein a difference in signals compared by a comparating circuit in FIG. 1 and a predetermined reference value are compared with each other, in which FIG. 3A shows a case wherein a difference signal is smaller than the reference value and FIG. 3B shows a case wherein the difference signal is larger than the reference value; and FIG. 4 is a block diagram showing another embodiment of the present invention.

DETAILED DESCRIPTION OF THE PREFERRED EMBODIMENTS

Embodiments of the present invention will be described below with reference to the accompanying drawings.

Figure 1:
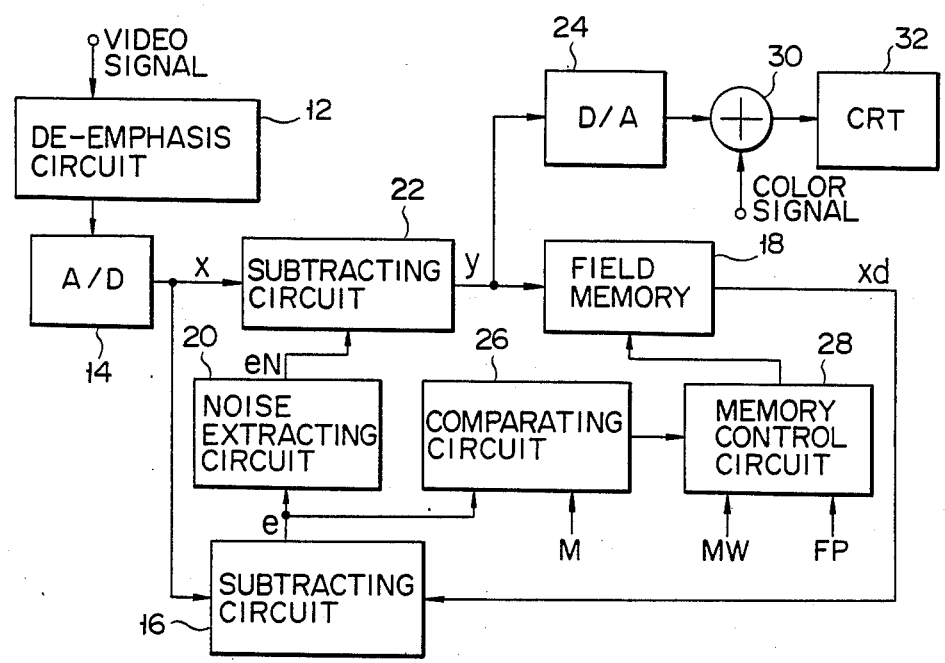
FIG. 1 is a block diagram of a noise reduction circuit according to an embodiment of the present invention.

FIG. 1 is a first embodiment, a block diagram of a noise reduction circuit which is applied to a VTR according to an embodiment of the present invention. A video signal (a luminance signal in this embodiment) output from a VTR (not shown) is supplied to de-emphasis circuit 12, in which the modulated output of the video signal is lowered. The video signal after de-emphasis is converted by A/D converter (analog-digital converter) 14 from an analog signal into a digital signal. Video signal x (an intensity signal, in this case) output from A/D converter 14 is supplied to subtracting circuit 16. Subtracting circuit 16 subtracts delayed video signal xd read out from field memory 18, which will be described in detail later, from video signal x, and outputs field difference signal e to noise extracting circuit 20 as a result.

In response to difference signal e, noise extracting circuit 20 extracts noise component signal eN. Noise component signal eN extracted by noise extracting circuit 20 is output to subtracting circuit 22. Video signal x from A/D converter 14 is supplied to subtracting circuit 22 together with noise component signal eN. Then, subtracting circuit 22 subtracts noise component signal eN from video signal x to remove noise. Video signal x from which the noise is removed is output from subtracting circuit 22 to field memory 18 and D/A converter (digital-analog converter) 24. Field memory 18 stores 1-field data of video signal y. Delayed video signal xd is produced by reading out the video signal with a timing delay corresponding to the 1 field. That is, delayed video signal xd is delayed by 1 field with respect to video signal y.

Difference signal e output from subtracting circuit 16 is also supplied to comparing circuit 26 together with external reference value M. Reference value M is a value set at a predetermined level with respect to the difference signal. Comparing circuit 26 compares difference signal e with reference value M, thereby determining whether video signal x represents a motion or motionless picture. The signal determined by comparing circuit 26 is supplied to memory control circuit 28.

Memory control circuit 28 controls writing of the video signal in the field memory in accordance with a state of the video signal for a predetermined field period. More specifically, memory control circuit 28 controls to inhibit video signal y supplied from subtracting circuit to be written in field memory 18 when video signal x represents a motionless picture in one of the field periods constituting a 1 frame. When video signal x represents a motion picture in the same period, memory control circuit 22 controls to allow video signal y to be written in field memory 18. On the contrary, memory control circuit 22 controls to allow video signal y to be written in field memory 18 in the other field period regardless of whether it represents the motion or motionless picture.

Video signal y input to D/A converter 24 is converted into an analog signal, and then output to adder 30 together with a color signal supplied from a head of the video unit (not shown). Adder 30 adds the video signal to the color signal and outputs the resultant signal to CRT display 32 as its output video signal.

Figure 2:
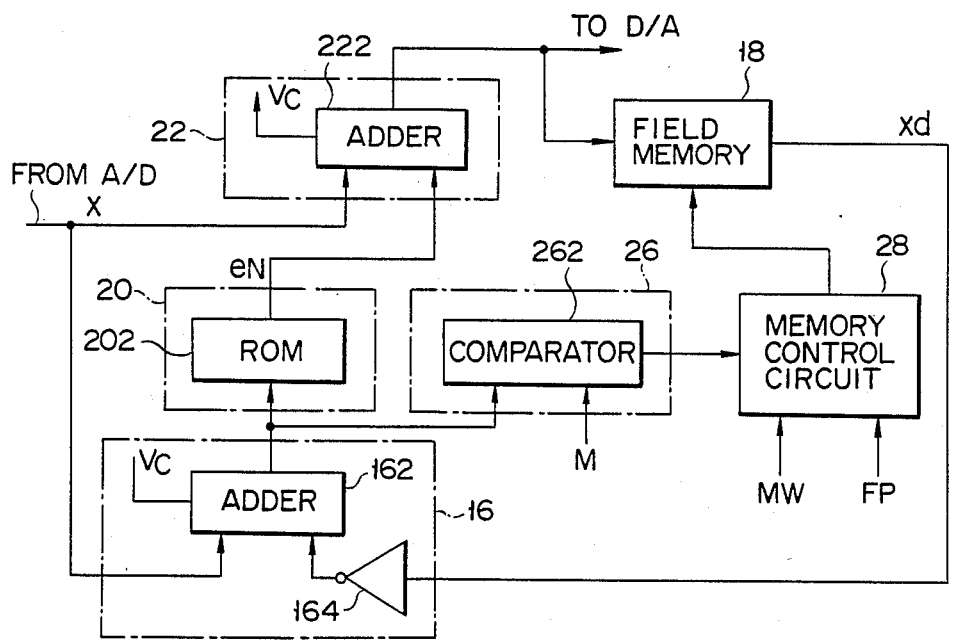
FIG. 2 is a block diagram showing part of the circuit in FIG. 1 in detail.

As shown in FIG. 2, subtracting circuit 16 comprises, e.g., adder 162 and inverter 164, and performs a subtraction using 2'complement. Accordingly, video signal x is subtracted from delayed video signal xd. Field difference signal e, as a subtraction result, is output to noise extracting circuit 20 and comparing circuit 26.

Noise extracting circuit 20 comprises, e.g., a ROM (read only memory). When difference signal e is supplied as an address input signal for the ROM, noise component signal eN written at an address corresponding to difference signal e in advance is read out and output. Comparing circuit 26 comprises, e.g., comparator 262. Difference signal e supplied to comparator 262 is compared with predetermined reference value M.

Similar to subtracting circuit 16, subtracting circuit 22 comprises adder 222. In adder 222, noise component signal eN is subtracted from video signal x. Video signal y from which noise component signal eN is eliminated is supplied to an external circuit such as D/A converter 24. Note that adders 162 and 222 are respectively coupled to a power source (e.g., 5 V).

Memory control circuit 28 controls whether to write video signal y in field memory 18 or not. Memory control circuit 28 receives a motion picture detection signal from comparing circuit 26 together with memory write signal MW and field discrimination signal FP. Memory write signal MW is supplied from an address generator (not shown). Field discrimination signal FP is generated on the basis of, e.g., a switching pulse of a magnetic head, however, may be generated on the basis of a vertical synchronizing signal.

Memory control circuit 28 performs control in the following manner. In one field period of 1 frame, it inhibits video signal y calculated by subtracting circuit 22 to be written in field memory 18 when input video signal x represents the motionless picture. When video signal x represents the motion picture, it writes video signal y calculated by subtracting circuit 22 in field memory 18. In the other field period of 1 frame, it writes video signal y calculated by subtracting circuit 22 in field memory 18 regardless of a signal from comparing circuit 26. The signals input to field memory 18 are controlled by memory control circuit 28 in this manner.

An operation of the embodiment will be described below.

First, a case will be described, wherein difference signal e output from subtracting circuit 16 is smaller than reference value M supplied to comparing circuit 26. As shown in FIG. 3A, the field correlation between pixels A and B at times $t_1$ and $t_2$ (in the first field period) is obtained. Then, a signal corresponding to difference (A—B) between the pixels, i.e., noise component signal eN corresponding to difference signal e is extracted by noise extracting circuit 20. In subtracting circuit 22 consisting of adder 222, noise component signal eN is extracted from video signal x of pixel A, and then output to an external circuit such as D/A converter 24 as video signal y from which noise component signal eN is eliminated. However, video signal y at this time is not written in field memory 18. That is, the video signal of pixel A is held in field memory 18 at time $t_2$ without being changed.

When the first field period (time $t_3$) of the next frame comes, the correlation between pixel C at time $t_3$ and pixel A of the immediately preceding frame (time $t_1$) is obtained. When difference e at time $t_3$ upon determination of the correlation is larger than reference value M, video signal y obtained by subtracting noise component signal eN from video signal x of pixel C is written in field memory 18. However, even if difference e between pixel A and pixel C is smaller than reference value M, video signal y obtained by subtracting noise component signal eN from video signal x is written in field memory 18. That is, when a motionless picture in which changes in image are small is to be processed, the field correlation and the frame correlation are alternately used, e.g., the correlation between pixels A and B, the correlation between pixels A and C, the correlation between pixels C and D, and the correlation between pixels C and E.

In contract to the above case, when difference signal e is larger than reference value M, a corresponding picture is processed in such a manner as shown in FIG. 3B. The field correlation between pixel A at time $t_1$ and pixel B at time $t_2$ is obtained. At this time, video signal obtained by subtracting noise component signal eN from video signal x is written in field memory 18. Then, the field correlation between pixel B and pixel C at time $t_3$ is obtained after a time corresponding to 1 frame has been elapsed from pixel A (time $t_1$). Video signaly obtained by subtracting noise component signal eN corresponding to difference e between the video signals of pixels B and C from video signal x of pixel C is written in field memory 18. That is, when a motion picture is processed, the correlation is obtained for every field, e.g., the correlation between pixels A and B, the correlation between pixels B and C, and the correlation between pixels C and D.

Referring to FIG. 1, subtracting circuit 16 outputs video signal x and the difference between video signal x and video signal xd of the immediately preceding field, i.e., difference signal e to noise extracting circuit 20 and comparing circuit 26.

Upon reception of difference signal e, noise extracting circuit 20 extracts noise component signal eN corresponding to difference signal e. In this case, when difference signal e is smaller than reference value M, a corresponding picture is regarded as a motionless picture. As a result, noise component signal eN corresponding to difference signal e is output from circuit 20, When difference signal e is larger than reference value M, a corresponding picture is regarded as a motion picture. As a result, a noise component signal of eN=0 is output from circuit 20. Subsequently, subtracting circuit 22 performs an operation of $$y = x - eN \ldots \qquad (1)$$

and hence video signal y from which the noise component is removed is calculated.

Similar to noise extracting circuit 20, comparing circuit 26 receives difference signal e and compares difference signal e with reference value M. When e≧M, a corresponding picture is regarded as a motion picture. Then, comparing circuit 26 outputs a motion picture detection signal to memory control circuit 28. Memory control circuit 28 allows memory write signal MW supplied from an address generator (not shown) to pass so as to output the signal to field memory 18 for every other field. In the other field period within the same frame, memory write signal MW is passed through memory control circuit 28 to field memory 18 in accordance with a comparison result of comparing circuit 26.

More specifically, in a first field period of 1 frame, memory write signal MW supplied to memory control circuit 28 is immediately passed. Then, video signal y calculated by subtracting circuit 22 is written in field memory 18. However, in a second field period of the same frame, when e≧M, the video signal is written in field memory 18, whereas when e<M, the contents in memory 18 in the first field period are held and not updated.

Therefore, when a motionless picture in which changes in image are small is to be processed, the field correlation and the frame correlation are alternately obtained, as shown in FIG. 3A. This prevents the degradation in vertical resolution. On the contrary, when a motion picture in which changes in image are large is to be processed, the correlation is obtained for every field, as shown in FIG. 3B, thereby preventing the occurrence of an after-image.

The video signal output from subtracting circuit 22 to D/A converter 24 is converted thereby from a digital signal into an analog signal, and is output to adder 30. Adder 30 adds this output video signal to a color signal processed by another system and supplied from the head of the VTR. The video signal from which noise is removed in this manner is monitored on CRT display 32.

Although in noise extracting circuit 20, a reference value equal to reference value M of comparing circuit 26 is set as a criterion for determining the motion or motionless picture, reference values may be independently set. In this case, the reference values may vary for every field, or depending on whether difference signal e is negative or positive.

In addition, in the above embodiment, writing of data in field memory 18 is controlled by memory control circuit 28. However, it is not limited to the above arrangement. More specifically, video signal y and video signal xd of the immediately preceding field may be switched in accordance with a comparison result of comparing circuit 26, and then the resultant signal may be input to field memory 18. That is, instead of controlling whether memory write signal MW is directly output or not, input signals to field memory 18 may be switched.

FIG. 4 shows a second embodiment, a noise reduction circuit in which input signals to field memory 18 are switched. Note that memory control circuit 28, switch 34 and delay circuit 36 are equivalent to those described in the first embodiment (FIG. 1), and hence a description thereof will be omitted.

Video signal (an intensity signal, in this case) x is output from a VTR (not shown) and supplied to subtracting circuits 16 and 22 through de-emphasis circuit 12 and A/D converter 14. Subtracting circuit 16 subtracts delayed video signal xd read out from field memory 18 from video signal x and outputs field difference signal e to noise extracting circuit 20 as the resultant signal.

Noise extracting circuit 20 extracts noise component signal eN in accordance with difference signal e. Noise component signal eN extracted by noise extracting circuit 20 in accordance with difference signal e is output to subtracting circuit 22 and memory control circuit 28. Subtracting circuit 22 subtracts noise component signal eN from video signal x. Video signal y from which noise is removed in this manner is output from subtracting circuit 22 to D/A converter 24 and first terminal 34a of switch 34.

Delayed video signal xd read out from field memory 18 is also supplied to delay circuit 36. Delay circuit 36 delays video signal xd, which has been delayed by 1-field period from video signal y, by another 1-field period. Video signal z delayed in this manner is output second terminal 34b of switch 34.

Switch 34 which receives video signals y and z is controlled by memory control circuit 28. Noise extracting circuit 20 receives field discrimination signal FP as well as noise component signal eN.

In one field period within a given frame, when input video signal x represents a motionless picture, switch 34 is switched by memory control circuit 28 to second terminal 34b. As a result, video signal z from delay circuit 36 is input to field memory 18. Similarly, when input video signal x represents a motion picture, switch 34 is switched to first terminal 34a. Then, video signal y is input to field memory 18.

In contrast to above case, in the other field period within the given frame, memory control circuit 28 causes switch 34 to be switched to first terminal 34a so as to write video signal y in field memory 18. Memory control circuit 28 controls signals supplied to field memory 18 by switching switch 34 in this manner.

In addition, in these embodiments, a case is described, wherein the video signal is an intensity signal. However, in a case wherein it is a color signal, if a chroma inverter for adjusting color phases between field signals is inserted between the output side of the field memory and the subtracting circuit in FIG. 1, since other circuit arrangements are equivalent to those in FIG. 1, the same effects can be obtained.

Furthermore, a color signal upon intensity/color signal separation or a decoded color difference signal may be used as the color signal described above.

As has been described above, according to the present invention, noise components are reduced by basically utilizing the field correlation, while the field correlation and the frame correlation are alternately obtained when a motionless picture is to be processed. Therefore, the occurrence of an after-image due to changes in image can be prevented, and the degradation in vertical resolution can also be prevented.

What is claimed is:

1. A noise reduction circuit for a video signal, said circuit comprising:
    an A/D converter for converting an input video signal into a digital signal;
    first subtracting circuit means for reducing a noise component included in said input video signal of said digital signal from said A/D converter by subtracting a noise component signal corresponding to said noise component from said digital signal;
    field memory means for storing at least 1-field data of an output from said first subtracting circuit means and allowing said stored data to be read out with a predetermined delay time;
    second subtracting circuit means for subtracting said data read out from said field memory means from said digital signal supplied from said A/D converter and outputting a subtraction result as a field difference signal;
    noise extracting circuit means for selecting said noise component signal corresponding to said noise component in accordance with said field difference signal from said second subtracting circuit means and outputting said selected noise component signal to said first subtracting circuit means;
    comparing circuit means for comparing said field difference signal from said second subtracting circuit means with a predetermined reference value, detecting said input video signal as a signal representing a motion picture when said field difference signal is larger than said reference value, and outputting a detection signal corresponding to said motion picture, and detecting said input video signal as a signal representing a motionless picture when said field difference signal is smaller than said reference value, and outputting a detection signal corresponding to said motionless picture;
    memory control circuit means for controlling whether to write a video signal supplied from said first subtracting circuit means to said field memory means in accordance with said detection signal output from said comparing circuit means; and
    a D/A converter for converting said digital signal from which said noise component is removed by said first subtracting circuit means into an analog signal and outputting a resultant signal.

2. A circuit according to claim 1, wherein said memory control circuit means inhibits the video signal subtracted by said first subtracting circuit means to be written in said field memory means when said input video is determined to represent a motionless picture by said comparing circuit means in one of field periods constituting a 1-frame period, writes said input signal subtracted by said first subtracting circuit means in said field memory means when said input video signal is determined to represent a motion picture, and writes said video signal subtracted by said first subtracting circuit in said field memory means regardless of a detection signal output from said comparing circuit means in the other of said field periods constituting said 1-frame period.

3. A circuit according to claim 2, wherein said memory control circuit means uses a switching pulse from a magnetic head as a signal for detecting one of said field periods constituting said 1-frame period.

4. A circuit according to claim 3, wherein said noise extracting circuit means comprises a ROM for selecting a noise component signal written in advance in accordance with said field difference signal from said second subtracting circuit means and outputting said selected signal to said first subtracting circuit means.

5. A circuit according to claim 4, wherein a characteristic of said noise component signal written in said noise extracting circuit means in advance is changed every field.

6. A circuit according to claim 5, wherein said predetermined reference value used by said comparing circuit means is set in accordance with a level of said field difference signal.

7. A circuit according to claim 6, wherein said first subtracting circuit means comprises an adder for adding said digital signal to said noise component, and said second subtracting circuit comprises an inverter for inverting data read out from said field memory, and an adder for adding data through said inverter to said digital signal.

8. A noise reduction circuit for a video signal, said circuit comprising:
an A/D converter for converting an input video signal into a digital signal;
first subtracting circuit means for reducing a noise component included in said input video signal of said digital signal from said A/D converter by subtracting a noise component signal corresponding to said noise component from said digital signal;
field memory means for storing at least 1-field data of an output from said first subtracting circuit means and allowing said stored data to be read out with a predetermined delay time;
second subtracting circuit means for subtracting said data read out from said field memory means from said digital signal supplied from said A/D converter and outputting a subtraction result as a field difference signal;
noise extracting circuit means for selecting said noise component signal corresponding to said noise component in accordance with said field difference signal from said second subtracting circuit means and outputting said selected noise component signal to said first subtracting circuit means;
delay circuit means for delaying said data read out from said field memory means for a predetermined period of time and outputting said data;
switching means, inserted between said first subtracting circuit means and said field memory means, for respectively supplying said video signal output from said first subtracting circuit means and a delayed video signal output from said delay circuit means to first and second terminals, and outputting either said video signal or said delayed video signal to said field memory means by switching and selecting said first or second terminal;
memory control circuit means for determining whether said input signal is regarded as a signal representing a motion or motionless picture in accordance with said field difference signal output from said noise extracting circuit means and switching said outputs supplied to said switching means by switching said terminals thereof, thereby controlling whether to write a video signal input to said field memory means; and
a D/A converter for converting said digital signal from which said noise component is removed by said first subtracting circuit means into an analog signal and outputting a resultant signal.

9. A circuit according to claim 8, wherein said memory control circuit means inhibits said video signal to be written in said field memory means by switching a switching terminal of said switching means to said second terminal when said input video represents a motionless picture in one of field periods constituting a 1-frame period, writes said input signal in said field memory means by switching said switching terminal of said switching means to said first terminal when said input video signal represents a motion picture, and writes said video signal in said field memory means by switching said switching terminal of said switching means to said first terminal regardless of whether said input video signal represents a motion or motionless picture in the other of said field periods constituting said 1, -frame period.

10. A circuit according to claim 9, wherein said memory control circuit means uses a switching pulse from a magnetic head as a signal for detecting one of said field periods constituting said 1-frame period.

11. A circuit according to claim 10, wherein said noise extracting circuit means comprises a ROM for selecting a noise component signal written in advance in accordance with said field difference signal from said second subtracting circuit means and outputting said selected signal to said first subtracting circuit means.

12. A circuit according to claim 11, wherein a characteristic of said noise component signal written in said noise extracting circuit means in advance is changed every field.

13. A circuit according to claim 12, wherein said first subtracting circuit means comprises an adder for adding said digital signal to said noise component, and said second subtracting circuit comprises an inverter for inverting data read out from said field memory, and an adder for adding data through said inverter to said digital signal.

* * * * *